March 18, 1958     J. BRAEDL ET AL     2,826,949
TOOL FOR INSTALLING PACKING
Filed March 9, 1956
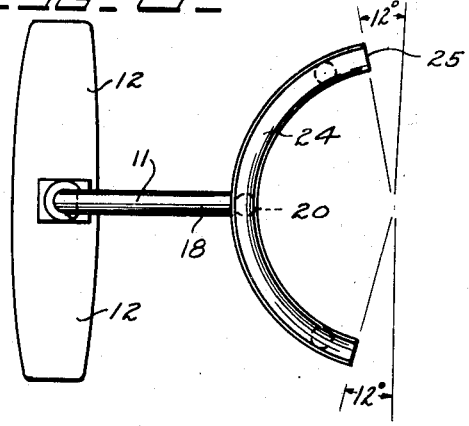
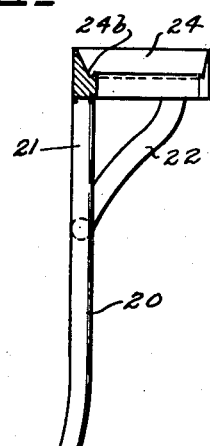
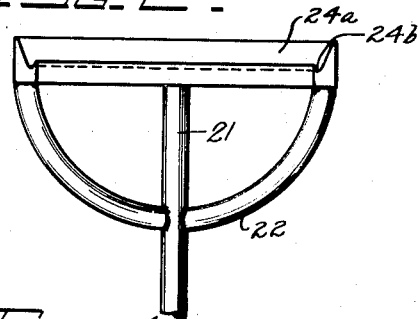
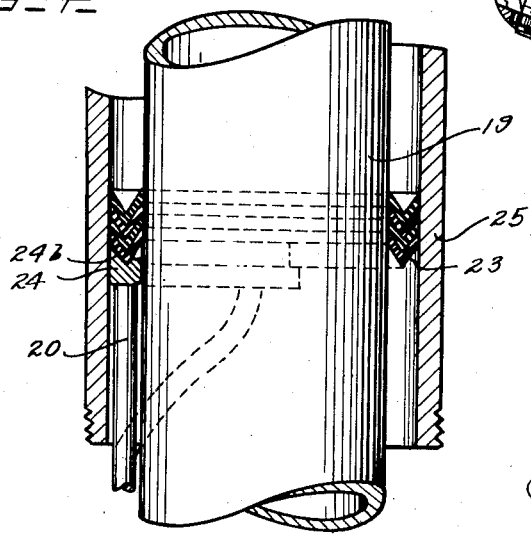
INVENTORS.
JOSEF BRAEDL
ANDREAS WEIGL
BY
ATTORNEYS

United States Patent Office 2,826,949
Patented Mar. 18, 1958

2,826,949

TOOL FOR INSTALLING PACKING

Josef Braedl, near Erding, and Andreas Weigl, Markt-Schwaben, Germany

Application March 9, 1956, Serial No. 570,649

5 Claims. (Cl. 81—8.1)

(Granted under Title 35, U. S. Code (1952), sec. 266)

The invention described herein may be manufactured and used by or for the United States Government for governmental purposes without payment to us of any royalty thereon.

This invention relates to a tool for installing packing rings and more particularly V packing rings on shock struts in the landing gear of aircraft.

The element of inaccessibility creates a problem in installing packing rings for example, fitting packing rings between the telescoping portions of shock struts. There is also the problem of damaging the edges of rings during the process of installation.

The object of the present invention is to provide a tool for the placement of packing rings, which meets and solves the problems above noted.

A further object of the invention is the provision of a tool which conforms to the shape of the packing rings, and guides them into place with an undistorting pressure.

A further object of the invention is the provision of a tool for the installation of V packing rings on landing gear, the handle of which is curved in such manner that the hand grip is removed to an accessible position and force is applied from an angular direction and becomes effective upon the packing ring in a direction in line with the direction of its correct movement in placement.

A further object of the invention is the provision of a tool capable of being inserted between the outer and inner cylinders of a shock strut to guide the placement of the V packing rings, so formed that the packing rings are pressed away from the inside surface of the outer cylinder thereby preventing damage to the sealing edges of the packing rings.

A further object of this invention is the provision of a tool for installing packing rings in any location and one which is simple, easily handled, inexpensive to manufacture and performs the installation effectively and quickly.

Other objects and advantages will appear as the description proceeds.

In the drawing,

Fig. 1 is a side elevational view of the tool for installing packing rings, parts being broken away and shown in section.

Fig. 2 is a fragmentary view of the device taken at right angles to Fig. 1.

Fig. 3 is an end elevational view of the drawing.

Fig. 4 is a cross section of a portion of a shock absorbing strut of the landing gear of an airplane illustrating the application of the tool in inserting V type packing rings therein.

Referring more particularly to the drawings, numeral 10 represents a handle which is provided at one of its ends with a hand grip 12 secured to the handle 10 by any convenient or desired means. The means as shown consists of an opening in the hand grip member through which the handle passes, a washer 13 welded to the handle 10, a removable washer 15, and a self-locking nut 16.

The handle is approximately 11 inches long, but it is to be understood that whenever precise dimensions are given the invention is in no way limited to these dimensions and they are given merely by way of example. The handle has three general areas, a linear area 20, an intermediate curved area 18, and a second linear area 11. The pitch of the curve is as follows: In a plane passing through the longitudinal axis of the handle parallel to the portion 20, the portion 11 of the handle is pitched at an 18° angle to this plane. At a point nearing the inner end, the handle branches into three forks or pressure distributing arms. One arm 21 continues in the line of the portion 20. They are all brazed or otherwise secured at spaced points to an arcuate packing placing portion 24. The pressure distributing arms 22 are curved to lie in the cylindrical projection of the circumference or circular curvature of the member 24 so that the whole device may be inserted into and between the two telescoping cylindrical members 19 and 21 of the shock absorbing struts of the landing gear of an airplane. The outer surface of the member 24 is of a shape to conform to the shape of a V packing 23. As shown, the packings or rings 23 are V shaped in cross section and the contacting surface of the arcuate member is complementary to the outer side of the V packing. It is so formed that it protects the packing from damaging contact with the outer ends of the strut cylinders when the insertion is made. The branches or arms 22 are secured to the placing member 24 by any desired means such as by welding or brazing. The pitch and curve of the handle 10 and arms 22 are important. Consider the section 20 of the handle in a vertical position, then the section 11 assumes an angle of 18 degrees to the vertical. This allows for accommodation of the elements of the landing gear. Thus the packing can be inserted and guided forwardly into the cylinder, the pressure always applied evenly and in the right direction from a point outside or radially spaced from the strut.

As will readily be seen, the arcuate placing member 24 conforms in thickness to substantially the space between the telescoping struts so that it will fit therein. Its arcuate length stops short by an interval of about 12° from each end of the semicircumference. This allows free axial and circumferential movement and convenient placement and removal.

The linear portion 20 of the handle 10 joins the arcuate portion 24 at its midpoint and is perpendicular to it. The arc of the member 24 is formed on a circumference such that it will conform to and can be inserted into the space between the telescoping struts such as 19 and 25 of the airplane landing gear. The arms or braces 22 lie in the cylindrical projection of the circumference of the member 24 so that they also freely fit into the space between the telescoping members 19 and 21.

The relationship of the parts and the operation of the device is as follows: As has been seen, the part 24, the braces 22 and the linear portion 20 all lie in the circumference or the projection of the circumference, so that they may be inserted between a pair of telescoping members. The inclination and curvature of the portions 11 and 18 of the handle 10 are such that the operator may grasp the hand grip 12, insert the tool between the telescoping portions of the shock struts and apply pressure. The point of application of the pressure is outside the circumference of either of the shock struts so that an effective hand grip can be made. Nevertheless, the effective application of the pressure is parallel to the struts and in a direction to avoid tilting. The result is a consistent forward pressure. In addition, this consistent forward force is applied by a surface which is formed to conform to the actual shape of the packing. The outwardly flared portion 24a of the member 24 urges the packing away from damaging contact with the edge of the strut surface, while the annular curved portion or shoulder 24b at the base or lower edge of the flared portion 24a is adapted to engage the annular apex portion of the V packing.

Although a specific embodiment of this invention has been shown and described, it is to be understood that the invention includes such modifications as can be made without departing from the spirit of the invention and that the invention is not to be considered as limited to the specific embodiment shown herein.

We claim:

1. A tool for the installation of packing rings comprising a packing placing member and a handle therefor, said handle being provided with a linear portion, an intermediate curved portion and a second linear portion provided with a hand grip, said second linear portion being pitched at an angle of approximately 18° to a plane parallel to the first linear portion, said packing placing member being arcuate in formation and perpendicular to said first linear portion and conforming to and insertable in the space between the telescoping struts of landing gear, said packing placing member being also provided with a surface conforming to the formation of the packing to be installed, means on said surface for urging said packing ring away from damaging contact with the strut surfaces, said handle and said arcuate placing member meeting and being secured together in perpendicular relationship, and a pair of brace members positioned between said arcuate placing member and said first linear section, said braces lying in the cylindrical projection of the circumference formed by said arcuate portion, to allow insertion of said tool between the telescoping struts of the landing gear.

2. A tool for installing packing between cylindrical telescoping members which comprises an arcuately formed packing placing member, a surface on said packing placing member which conforms complementarily to the contour of said packing, a handle connected to said arcuate member in perpendicular relation thereto, braces connected between said arcuate member and said handle and lying in the projected circumference of said arcuate member, said handle having a curved portion providing means for applying uniform, consistent pressure on said packing in a direction parallel to the axis of said telescoping members from a point outside their circumference and in angular relation to them.

3. A tool for the installation of V-packing between two telescoping members, comprising arcuate packing placing means having a V-surface conforming to the contour of said packing, a handle secured to said arcuate member provided with a portion extending normally therefrom for entrance between said telescoping members, and provided also with an outwardly curved portion for clearing the outer circumference of the outermost of said telescoping members, a hand grip on said last named portion, a plurality of pressure distributing arms connecting said handle and said arcuate member, said arms lying in the projection of said arcuate member, so that pressure applied thereto will uniformly transmit pressure to said packing and in a direction to preclude jamming and damage to said packing.

4. A tool for installing packing between two telescoping cylindrical elements comprising an arcuate member of the order of 156°, means for applying pressure to said arcuate member in a direction normal thereto and distributed evenly throughout its length, said means comprising a handle attached to said arcuate member at its approximate midpoint and extending normally thereto, arms extending between said handle and said arcuate member lying in their entirety in the cylindrical surface formed by the projection of said arcuate member.

5. Means for applying pressure evenly to V-packing elements located between two telescoping struts and from a point radially spaced from said packing elements and in a direction substantially parallel to the direction of movement of the packing element during installation, said means comprising an arcuate member for contacting and applying pressure to said packing elements, said arcuate member having a V-surface complementary to said V-packing, a plurality of arms extending from said arcuate member from points distributed throughout its length, said arms lying in the cylindrical surface formed by the projection of the arc of said arcuate member, a handle attached to said arms, said handle having a portion of its length also lying in the cylindrical surface formed by the projection of said arc and perpendicular to the plane of the arc.

References Cited in the file of this patent

UNITED STATES PATENTS

| | | |
|---|---|---|
| 988,055 | Winskill | Mar. 28, 1911 |
| 1,512,818 | Bumpus | Oct. 21, 1924 |
| 1,850,459 | Jefferis | Mar. 22, 1932 |